G. ROBINSON.
SHOCK ABSORBER ARM.
APPLICATION FILED FEB. 10, 1919.
1,314,904.
Patented Sept. 2, 1919.
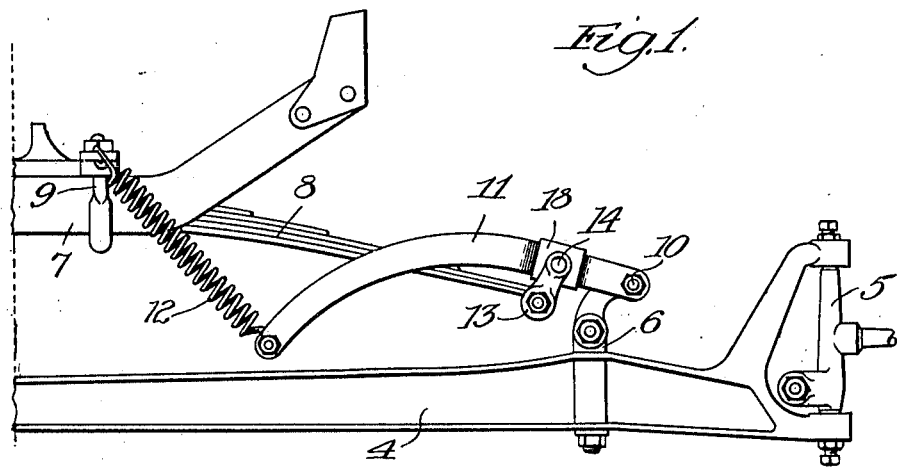
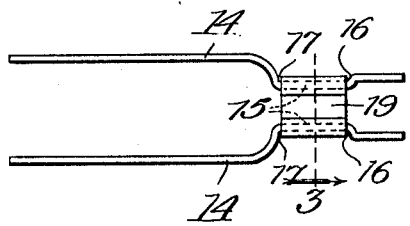
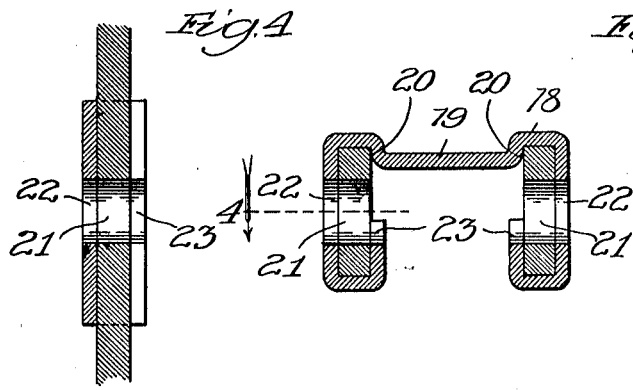
Inventor,
Giles Robinson,
By Dyrenforth, Lee, Chritton & Wiles,
Attys.

UNITED STATES PATENT OFFICE.

GILES ROBINSON, OF CHICAGO, ILLINOIS, ASSIGNOR TO WILCOX PRESSED STEEL COMPANY, OF CHICAGO, ILLINOIS, A CORPORATION OF ILLINOIS.

SHOCK-ABSORBER ARM.

1,314,904.     Specification of Letters Patent.     Patented Sept. 2, 1919.

Application filed February 10, 1919. Serial No. 276,054.

*To all whom it may concern:*

Be it known that I, GILES ROBINSON, a citizen of the United States, residing at Chicago, in the county of Cook and State of Illinois, have invented a new and useful Improvement in Shock-Absorber Arms, of which the following is a specification.

My invention relates more particularly to a novel, simple, and highly durable construction of double-arm for shock absorbers of the cantaliver type. These arms are pivoted at one end to the chassis of the automobile and at their opposite ends are connected with springs which depend from the body of the car, the body-supporting springs of the car being pivotally connected with the arms intermediate the ends of the latter, thereby producing an action similar to a cantaliver.

These arms are formed of a pair of parallel bars pivoted as above explained and connected together to produce a rigid unitary structure, but as they have been heretofore commonly manufactured, it has necessitated the punching of holes in the members forming the arm and the provision of a member riveted thereto, with the result the arms were unduly weakened, and the rivets work loose impairing, if not destroying, the efficiency of the arm.

My primary object is to provide a novel, simple, durable and economical construction of double-arm.

Referring to the accompanying drawing, Figure 1 is a view in elevation of a portion of the front axle and the adjacent portion of the body, shown as equipped with a shock absorber, the double-arm of which is constructed in accordance with my invention. Fig. 2 is a plan view of the double-arm. Fig. 3, a section taken at the line 3 on Fig. 2 and viewed in the direction of the arrow; and Fig. 4, a section taken at the line 4 on Fig. 3 and viewed in the direction of the arrow.

Referring more particularly to Fig. 1, one end of the front axle of an automobile is represented at 4 and carries the steering knuckle represented at 5, this axle being provided with the usual upwardly extending member or perch, 6. Above the axle 4 is the body 7 of the automobile which carries the leaf springs, one only of which is represented at 8, the springs being held in place to the body by the shackles, one of which is represented at 9 in accordance with common practice, it being understood that the view in Fig. 1 is taken looking toward the front of the automobile. Pivotally supported, as indicated at 10 on the perch 6, is the double-arm structure represented at 11 which is connected at its other ends, with the lower ends of coiled springs 12, one only of which is shown, these springs being connected with the shackles 9. The adjacent end of the leaf spring 8 is pivotally connected at a link 13 swiveled thereon, with the arm 11, at the pin 14, the general arrangement of the parts described being in accordance with common practice.

As hereinbefore stated my invention relates more particularly to the double-arm structure 11, this structure in accordance with the preferred embodiment of my invention, being formed of the two members 14 of similar shape and size each provided between its ends with an offset portion 15 presenting spaced shoulders 16 and 17. The members 14 are connected together through the medium of a band 18 preferably of sheet steel which extends across the upper surfaces of the portions 15 and the space therebetween, thence across the outer lateral surfaces of the members 15 and the bottom surfaces thereof and preferably only part-way across the inner surfaces of the portions 15, this band very tightly embracing the portions 15 at the surfaces stated and preferably being formed with the downwardly offset portion 19 to cause shoulders 20 to be formed adjacent the inner surfaces of the portions 15.

It will be understood from the foregoing by providing the band 18 of relatively rigid material, the members 14 will be tightly gripped by the band in spaced relation and held rigidly relative to each other, in the original position in which they are connected together, without danger of becoming disarranged.

In the forming of the double-arm structure it is preferred that the members 14 be bent to the shape shown and the connecting band 18 likewise to the shape shown, excepting for the portions thereof which extend across the undersides of the members 14 and up along the inner sides thereof, as separate and independent operations, and the parts united by applying the band 18 to the members 14 to cause the latter to extend at the upper edges of their portions 15 into the channels provided in the band 18 between the shoulders 20 and the portions laterally therebeyond, to position the members 14 in the proper position relative to each other, and the members so assembled introduced into any suitable press for finishing the bending of the band 18 to the position shown in Fig. 3 to effect the rigid clamping together of the parts.

The connection between the arm structure 11 and the link 13 is through the medium of the bolt 14 which extends through alining openings 21 in the members 14 and openings 22 and 23 in the band 18 whereby a broad bearing surface for the bolt is provided.

It will be readily understood from the foregoing that by constructing the arm in accordance with my invention it may be made very economically, and is very strong and durable.

While I have illustrated and described a particular construction embodying my invention, I do not wish to be understood as intending to limit it thereto, as the same may be variously modified and altered without departing from the spirit of my invention.

What I claim as new and desire to secure by Letters Patent, is:—

1. In a vehicle, the combination with its body and the structure upon which it is supported, of a double-arm device comprising a pair of members arranged side by side in spaced relation, and a band connecting said members together, said band extending crosswise of said members and presenting upper and lower channels into which the upper and lower edges of said members snugly extend, said double-arm being pivoted at one end to said structure, a spring interposed between said structure and body and connected with said double-arm between the ends of the latter, and springs connected with said body and with the other ends, respectively, of said members.

2. In a vehicle, the combination with its body and the structure upon which it is supported, of a double-arm device comprising a pair of members arranged side by side in spaced relation, and each inwardly deflected between its ends to present spaced shoulders, and a band connecting said members together, said band extending crosswise of said members and between said shoulders and presenting upper and lower channels into which the upper and lower edges of said members snugly extend, said double-arm being pivoted at one end to said structure, a spring interposed between said structure and body and connected with said double-arm between the ends of the latter, and springs connected with said body and with the other ends, respectively, of said members.

3. In a vehicle, the combination with its body and the structure upon which it is supported, of a double-arm device comprising a pair of members arranged side by side in spaced relation, and a band connecting said members together, said band extending crosswise of said members and provided with a downwardly deflected section between its ends presenting shoulders which together with the adjacent portions of the band form channels for the upper edges of said members, said band at its lower portion presenting channels into which the lower edges of said members extend, said members being snugly confined in said channels, said double-arm being pivoted at one end to said structure, a spring interposed between said structure and body and connected with said double-arm between the ends of the latter, and springs connected with said body and with the other ends, respectively, of said members.

4. A double-arm structure for shock absorbers, comprising a pair of members arranged side by side in spaced relation and each inwardly deflected between its ends to present spaced shoulders, and a band connecting said members together, said band extending crosswise of said members and between said shoulders at said deflected portions to extend between said shoulders, said band being formed with a downwardly deflected portion forming spaced shoulders which latter, together with the adjacent portions of the band, form channels for the upper edges of said members, the lower edges of said band being formed with channels into which the lower edges of said members extend, said members snugly fitting in said channels, and alining perforations in said members and those portions of said band which extend across the outer faces of said members.

5. A double-arm structure for shock absorbers comprising a pair of members arranged side by side in spaced relation, and a band extending transversely of said members and connecting them together in spaced relation, said band extending over the outer and inner surfaces of said members, and said members and band containing alining perforations of substantially the same diameter, the perforations in said band extending through the portions thereof both at the inside and outside of said members whereby a relatively wide bearing is provided.

GILES ROBINSON.